(12) United States Patent
Timm

(10) Patent No.: US 6,367,259 B1
(45) Date of Patent: Apr. 9, 2002

(54) BATTERY-LESS SOLAR POWER SYSTEM

(76) Inventor: Miguel A. Timm, 17319 Cypress Spring Dr., Spring, TX (US) 77388-5721

( * ) Notice: Subject to any disclaimer, the term of this patent is extended or adjusted under 35 U.S.C. 154(b) by 0 days.

(21) Appl. No.: 09/504,504

(22) Filed: Feb. 15, 2000

(51) Int. Cl.$^7$ ............................................... B60K 16/00
(52) U.S. Cl. ................................... 60/641.8; 60/641.15
(58) Field of Search ............................ 60/641.1, 641.8, 60/641.15

(56) References Cited

U.S. PATENT DOCUMENTS

| | | | |
|---|---|---|---|
| 4,626,983 A | * 12/1986 | Harada et al. | 363/132 |
| 5,005,360 A | 4/1991 | McMurtry | |
| 5,576,533 A | * 11/1996 | Tantraporn | 250/214 R |
| 5,621,248 A | * 4/1997 | De Villiers | 290/30 R |
| 5,775,107 A | 7/1998 | Sparkman | |
| 5,809,784 A | 9/1998 | Kreuter | |
| 5,884,481 A | 3/1999 | Johansson et al. | |
| 5,898,585 A | * 4/1999 | Sirichote et al. | 363/132 |

* cited by examiner

Primary Examiner—Hoang Nguyen

(57) ABSTRACT

A photovoltaic energy system that accumulates mechanical energy, i.e., pneumatic or hydraulic pressure, or performs mechanical work, i.e., pumping water, without using electrochemical batteries. The system includes one or more photovoltaic panels, one or more high capacitance electrical capacitors, an electrical motor and an electric/electronic control circuit. In essence, the system takes the energy produced by the photovoltaic modules and accumulates it in the capacitors. Once enough energy is accumulated to run the motor, the controller circuit activates the motor. As the motor consumption is larger than the power produced by the photovoltaic module, it takes current from the charged capacitors and the voltage in the capacitors quickly decreases. Once the voltage reaches a minimum where the operation of the motor is no longer practical, the control circuit stops the motor to let the photovoltaic modules recharge the capacitors and the cycle is then repeated. What the above arrangement does is to take the small amount of power generated by a photovoltaic modules and concentrate it in an electrical capacitor. The accumulated energy is then used to produce a burst of power to run an electrical motor which in turn performs the desired mechanical work such as compressing air, pumping hydraulic pressure or pumping water.

8 Claims, 5 Drawing Sheets

BATTERY-LESS SOLAR POWER SYSTEM

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of power systems, and more particularly to a battery-less solar power system.

2. Description of Related Art

As can be seen by reference to the following U.S. Pat. Nos. 5,005,360; 5,775,107; 5,809,784 and 5,884,481 the prior art is replete with myriad and diverse solar power systems.

While all of the aforementioned prior art constructions are more than adequate for the basic purpose and function for which they have been specifically designed, they are uniformly deficient with respect to their failure to provide a simple, efficient, and practical solar power system that operates without batteries. The need to perform mechanical work from photovoltaic power is not new and the most common approach has been the use of photovoltaic modules connected to battery banks, which in turn energizes an electrical motor to perform the desired mechanical work. Given the nature of the electrochemical batteries, several disadvantages are inherent to the traditional solar/battery combination. Batteries cannot tolerate high temperatures. For every 10° C. increase in ambient temperature, the life of the batteries is cut in half. This factor alone limits the battery life to roughly two years if used in places such as the deserts in the Middle East. Furthermore, additional devices for cooling are often needed to reduce the detrimental effects of high ambient temperatures, adding to the cost and complexity of the system. Also, batteries are bulky and heavy. This causes the solar system to be bulky and heavy. Further, batteries need precise voltage controllers to prevent them from being damaged by excessive charging or discharging, adding to the expense and complexity of the system. Batteries can generate explosive gas mixtures that create hazardous conditions, especially if enclosed with electrical equipment capable of producing sparks. The expenses associated with the use of batteries includes the batteries itself, which are to be replaced periodically, plus the large and strong enclosure needed to house them and the structure needed to support the enclosure. Electromechanical batteries are also an ecological hazard since they contain acids, heavy metals and chemicals that are detrimental to the environment.

As a consequence of the foregoing situation, there has existed a longstanding need for a new and improved solar power system and the provision of such a construction is a stated objective of the present invention.

BRIEF SUMMARY OF THE INVENTION

Briefly stated, the present invention provides a photovoltaic energy system that accumulates mechanical energy, i.e., pneumatic or hydraulic pressure, or performs mechanical work, i.e., pumping water, without using electrochemical batteries. The system includes one or more photovoltaic panels, one or more high capacitance electrical capacitors, an electrical motor and an electric/electronic control circuit. In essence, the system takes the energy produced by the photovoltaic modules and accumulates it in the capacitors. Once enough energy is accumulated to run the motor, the controller circuit activates the motor. As the motor consumption is larger than the power produced by the photovoltaic module, it takes current from the charged capacitors and the voltage in the capacitors quickly decreases. Once the voltage reaches a minimum where the operation of the motor is no longer practical, the control circuit stops the motor to let the photovoltaic modules recharge the capacitors and the cycle is then repeated. What the above arrangement does is to take the small amount of power generated by a photovoltaic modules and concentrate it in an electrical capacitor. The accumulated energy is then used to produce a burst of power to run an electrical motor which in turn performs the desired mechanical work such as compressing air, pumping hydraulic pressure or pumping water.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
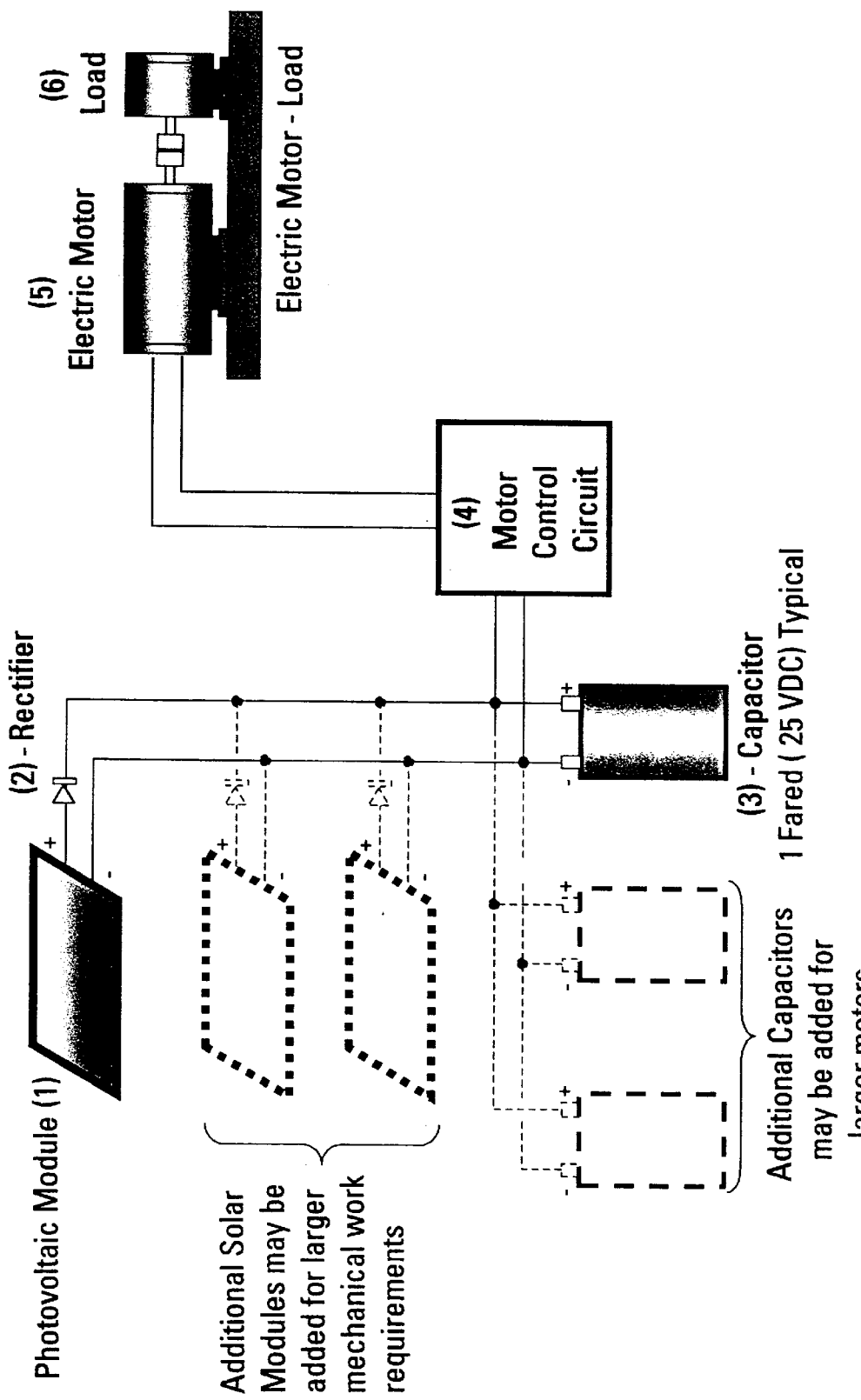
FIG. 1 is a schematic view illustrating the general arrangement of the solar power system of the present invention.

As can be seen by reference to the drawings, and in particularly to FIG. 1, the solar power system that forms the basis of the present invention is shown schematically. The battery-less solar power system does not use electrochemical batteries and it can be designed to be much smaller and less expensive than the systems with batteries being built until now. Furthermore, it can be built to provide a far more reliable service even in environments with extreme high temperatures.

Figure 2:
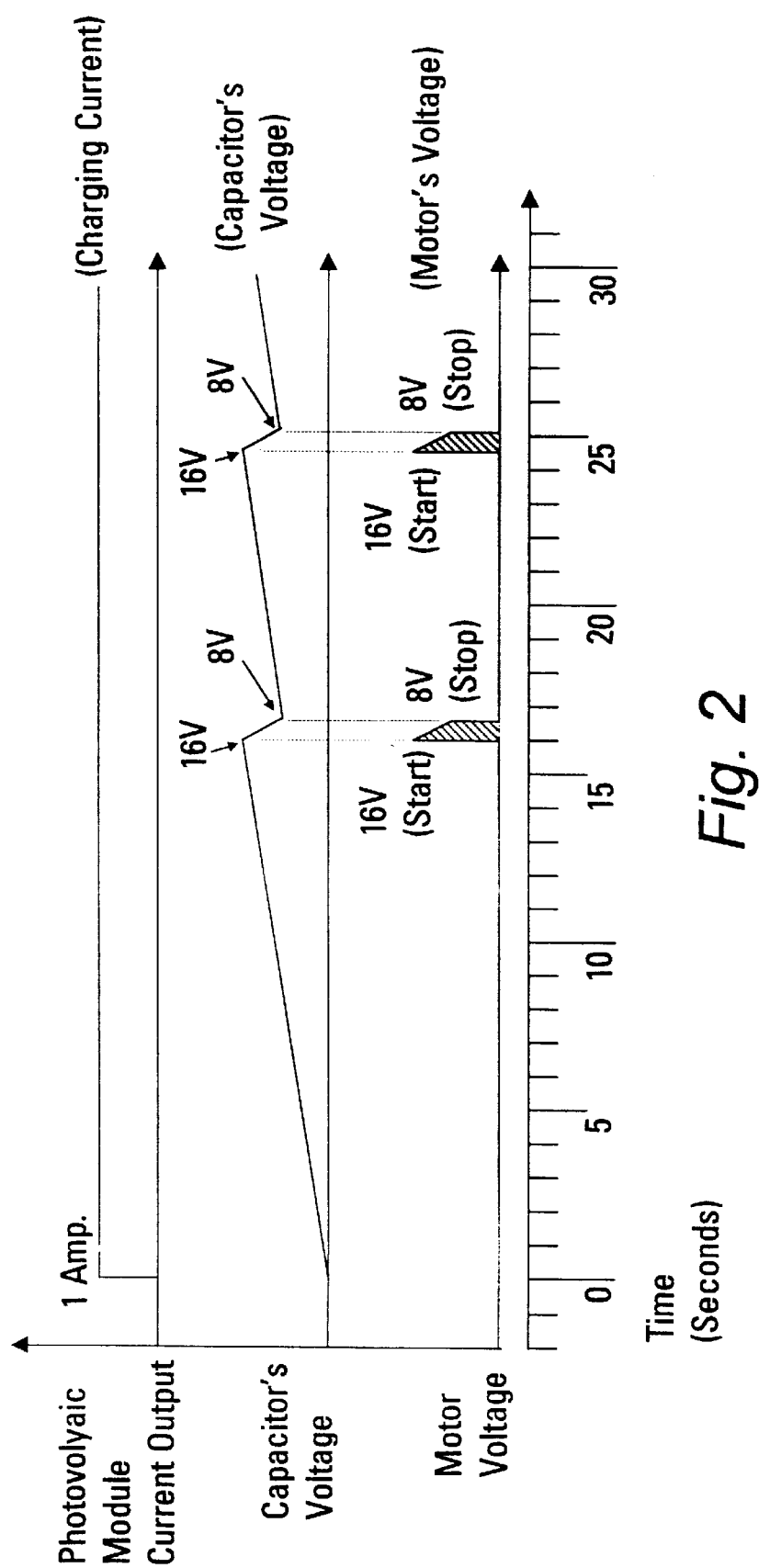
FIG. 2 is a graphic representation of the typical motor operation using the solar power system.
Figure 3:
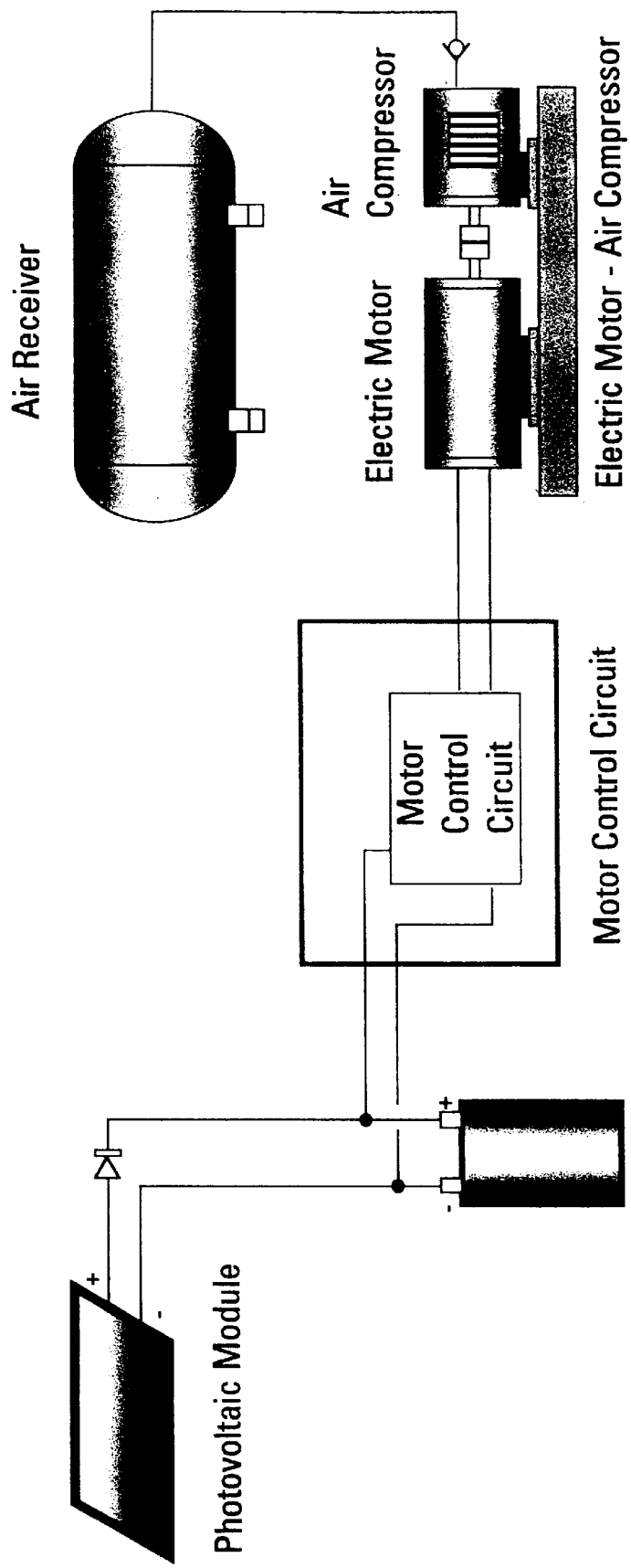
FIG. 3 is a schematic view similar to FIG. 1 but showing the motor coupled to a pneumatic system.
Figure 4:
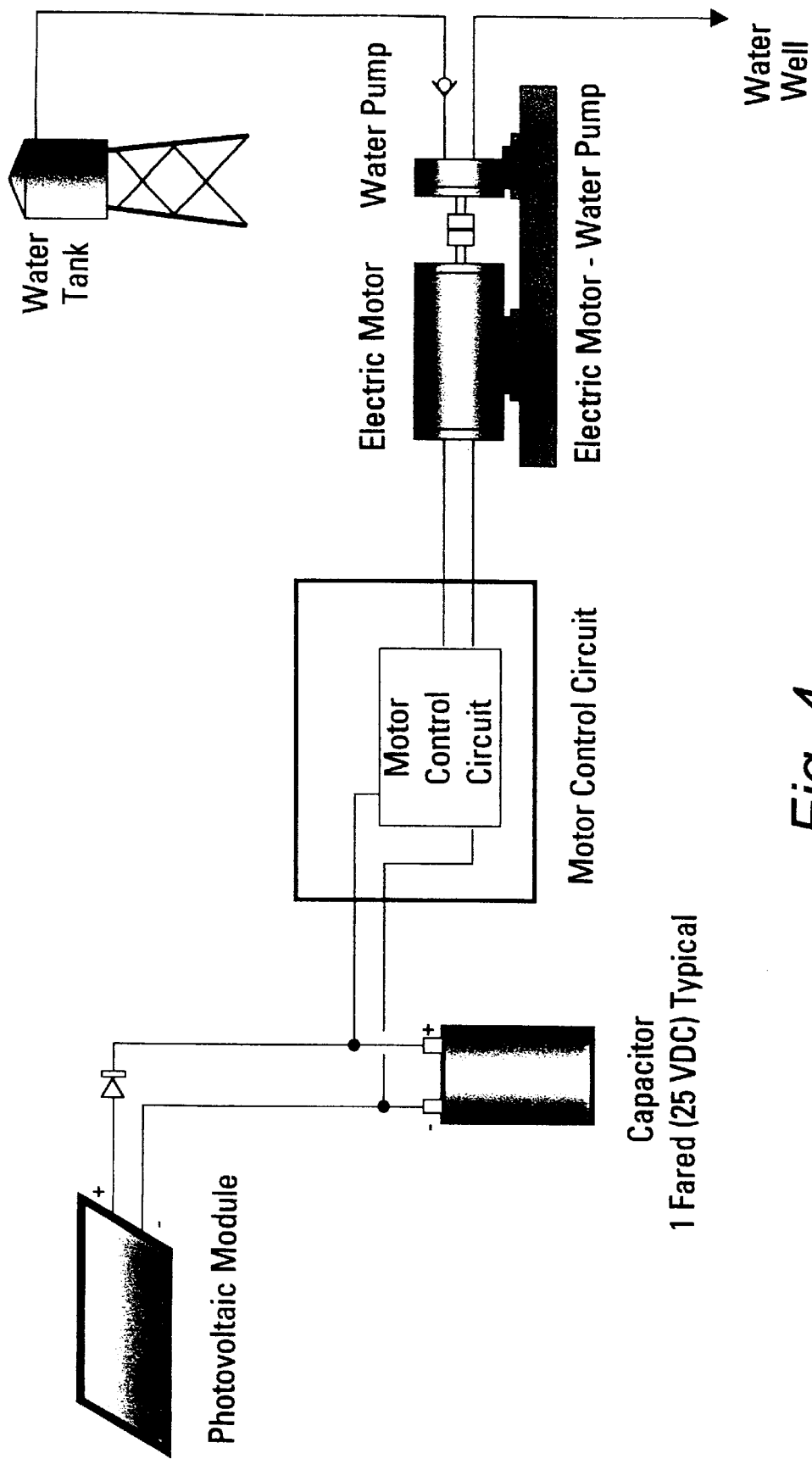
FIG. 4 is a schematic view similar to FIG. 1 but showing the motor used to perform the mechanical work of pumping water.
Figure 5:
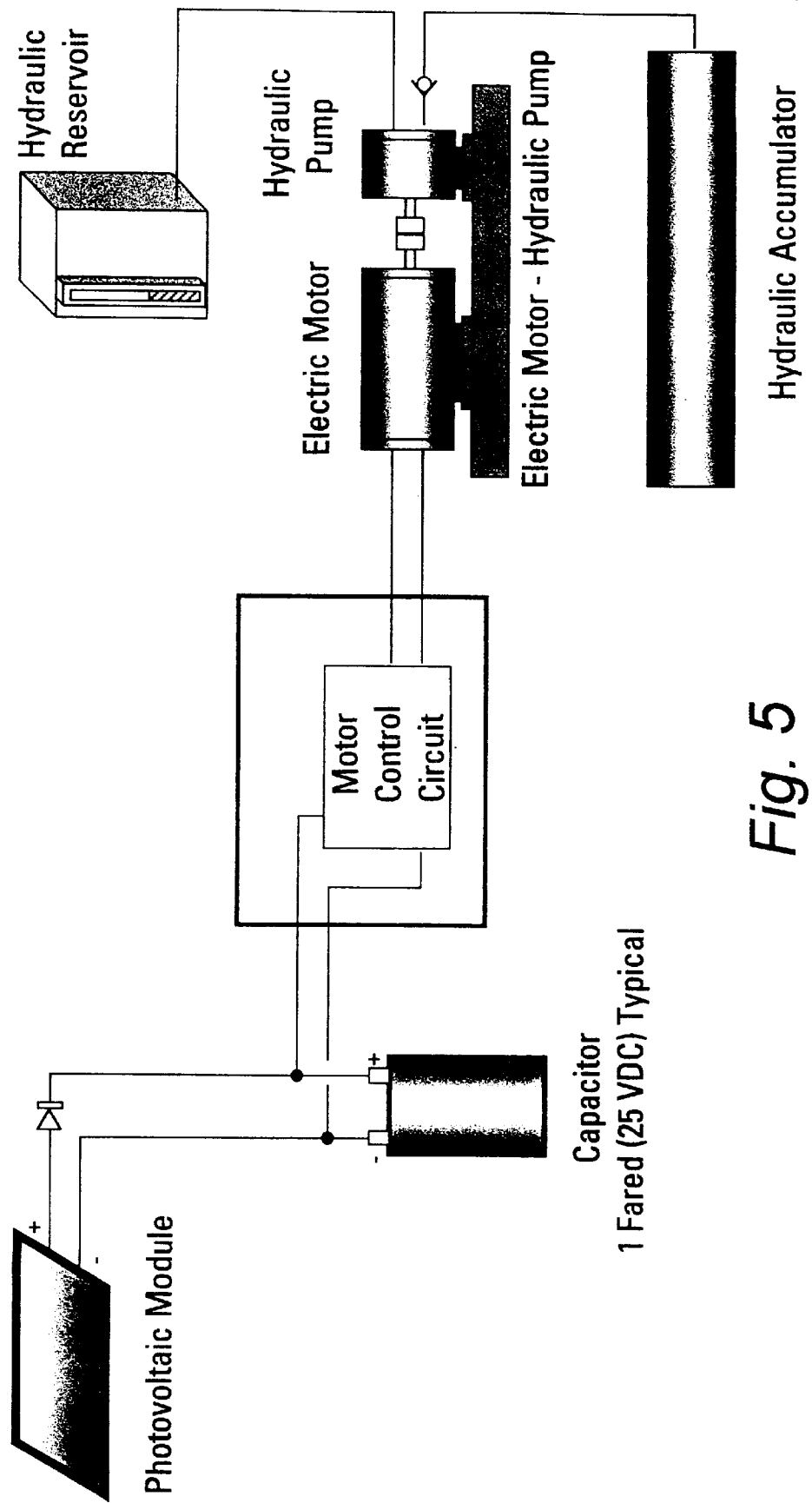
FIG. 5 is a schematic view similar to FIG. 1 but showing the motor coupled to a hydraulic system.
Figure 3:
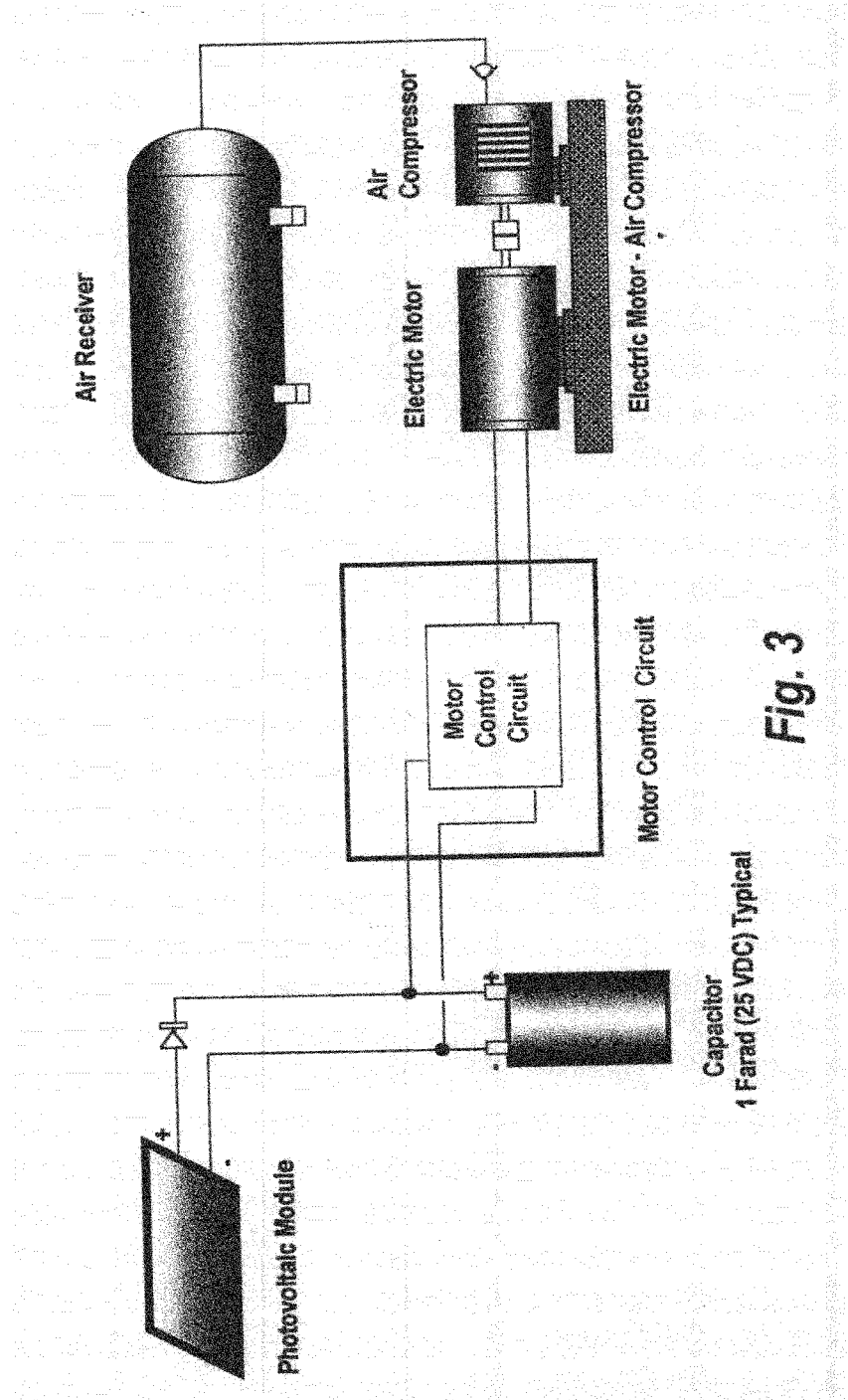
Figure 4:
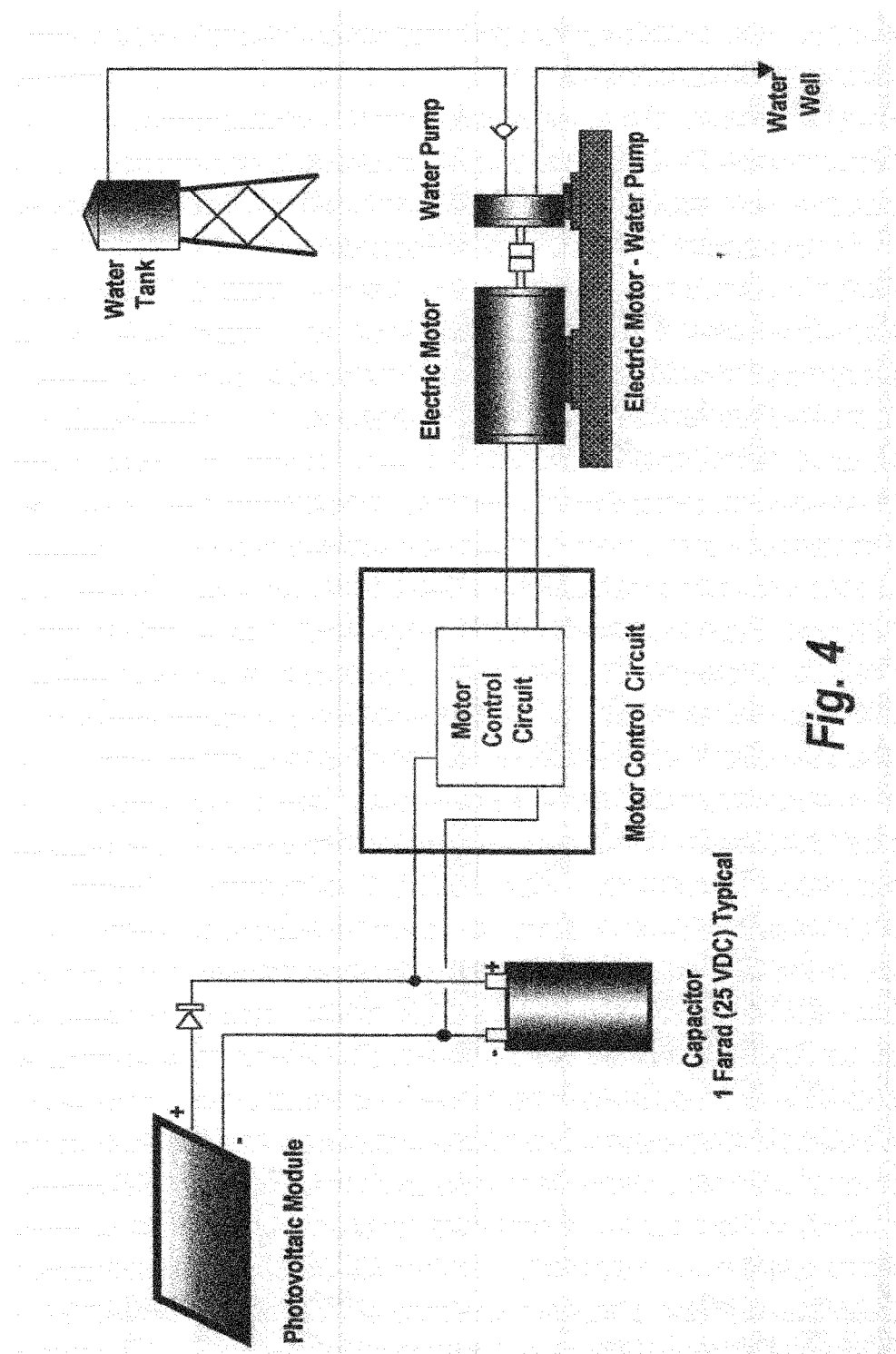
Figure 5:
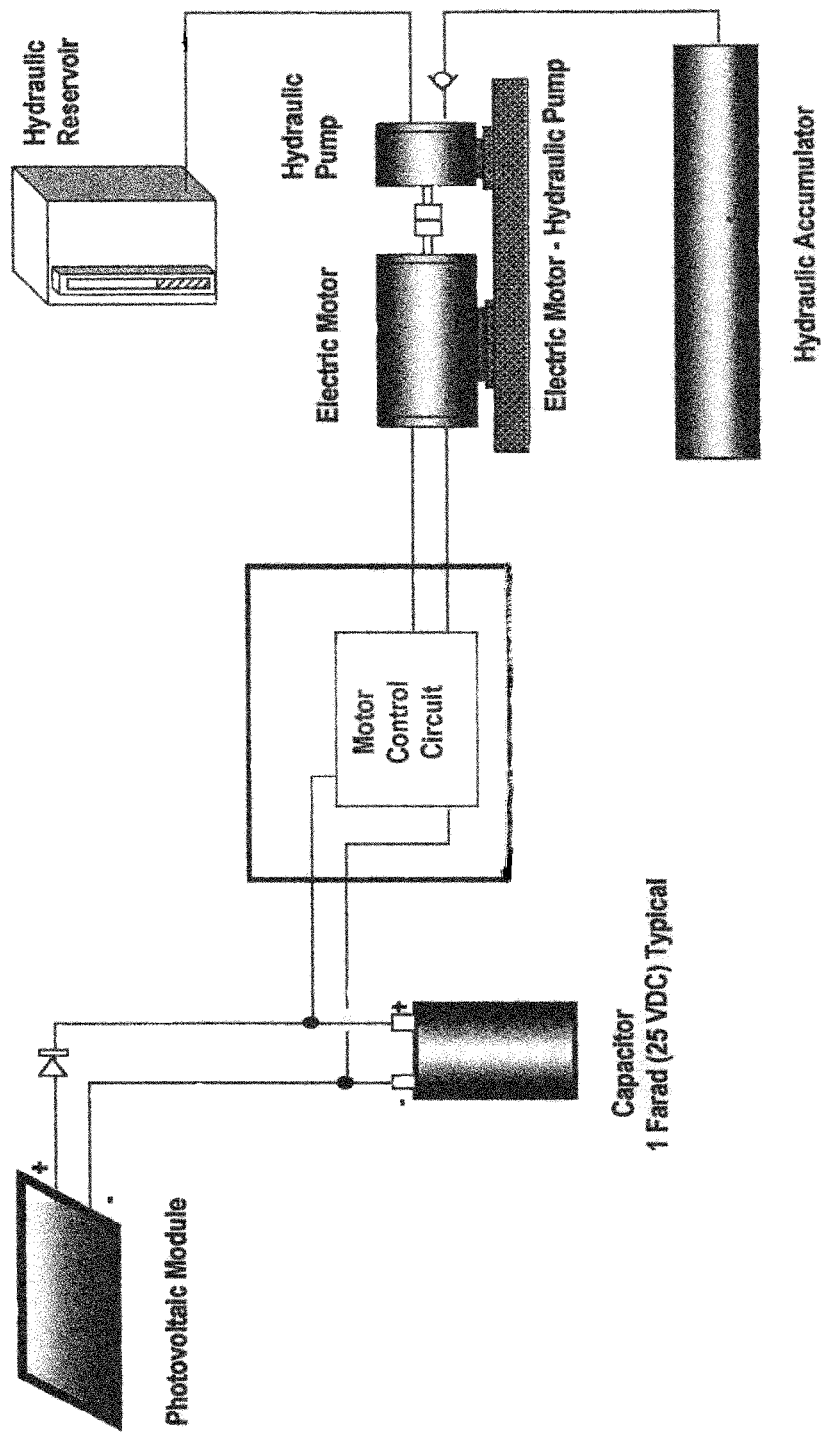

The operation of the battery-less solar power system is illustrated in FIGS. 1 and 2. The photovoltaic module 1 transforms the solar radiation into electricity and the current produced goes through the rectifier 2 and into the positive terminal of the capacitor 3. The negative terminal of the capacitor 3 is connected directly to the negative of the photovoltaic module 1.

Connected to the capacitor 3 is a motor control circuit 4 designed to have a very low power consumption in order to maximize the system's efficiency. The motor control circuit 4 reads the voltage in the capacitor 3 and once enough energy has been accumulated, i.e., by detecting a voltage about 16V, it activates the electric motor 5. When the electric motor 5 runs, the capacitor 3 releases the stored energy and once the capacitor 3 reaches a point of discharge where efficient operation is not practicable, i.e., below 8V, the motor control circuit 4 deactivates the electric motor 5.

As an example, FIG. 2 shows a graphic with the typical operation of a system where the photovoltaic module 1 generates a current of 1A, the capacitor 3 is rated at 1 Farad, the electric motor 5 consumes 11A, and the start and stop voltages are set at 16 and 8V, respectively.

As indicated in FIG. 2, after the capacitor 3 reaches the charged point of 16V, it runs for approximately 0.8 second before the voltage decreases to 8V where it stops. Once stopped, the capacitor starts charging again and after eight seconds it reaches the charged condition and the electric motor 5 runs again. As indicated in this example, the complete cycle would repeat every 8.8 seconds which means that the electric motor 5 will run more than 400 times each hour with a total run time of more than 320 seconds. The accumulative effect of the short runs adds up to the accumulation of considerable amount of mechanical work, i,e., hydraulic energy accumulated, compressed air, pumped water, etc. The system is to include the means to suspend operation, i.e., a switch that disconnects the photovoltaic module, if the desired pressure or volume is achieved.

The values proposed in the above example are for illustration purposes only. The actual size of the components and voltage levels are to be determined for each application on base of the following considerations:

Design Calculations of the System

The calculations for the charging and discharging of the capacitor 3 are based on the following equation:

$$C = \frac{(I * t)}{V},$$

where,
C=Capacitance in Farads
I=Electric Current in Amps
t=Time in Seconds
V=Voltage in Volts From the above, to calculate the charging time, the following equation is used:

$$t_{(charging)} = \frac{[Capacitance * (Start\ Voltage - Stop\ Voltage)]}{Photovoltaic\ Modules's\ Current}$$

Also, to calculate the motor running time, the following equation is used:

$$t_{(running)} = \frac{[Capacitance * (Start\ Voltage - Stop\ Voltage)]}{(Motor\ Consumption\ Current - Photovoltaic\ Modules's\ Current)}$$

Sizing Considerations

Photovoltaic Module 1. The voltage and current demanded from the photovoltaic module 1 are to be based on the amount of mechanical work and the availability of solar radiation available in the geographical area.

Rectifier 2. The rectifier 2 is to be selected to have sufficient capacity to withstand the current generated by the photovoltaic module 1. This device is non-critical and its only function is to prevent the back current and consequential discharging of the capacitor 3 during night time. It may or may not be used depending on the characteristics of the motor control circuit 4.

Capacitor 3. The size of the capacitor 3 is to be determined by the consumption of the electric motor 5 to insure that enough capacitance is provided to support a minimal running time, sufficient to generate the desired mechanical work.

Motor Control Circuit 4. The motor control circuit 4 is to be designed to control the power going to the electric motor 5. In general, this module will use standard electronic circuits and, when required, commercially available driver devices. Depending on the application, the motor control circuit 4 could be as simple as a voltage comparator driving a relay or as sophisticated as an inverter circuit driving a brush-less electric motor.

Electric Motor 5. The electric motor 5 is to be sized and selected to insure its capability to perform the expected mechanical work.

Working Voltage. The operating voltage is to be determined by the commercially available components, system's simplicity and personnel safety. The motor start and stop voltages are to be selected to insure the motor 5 operates within safe and efficient levels.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

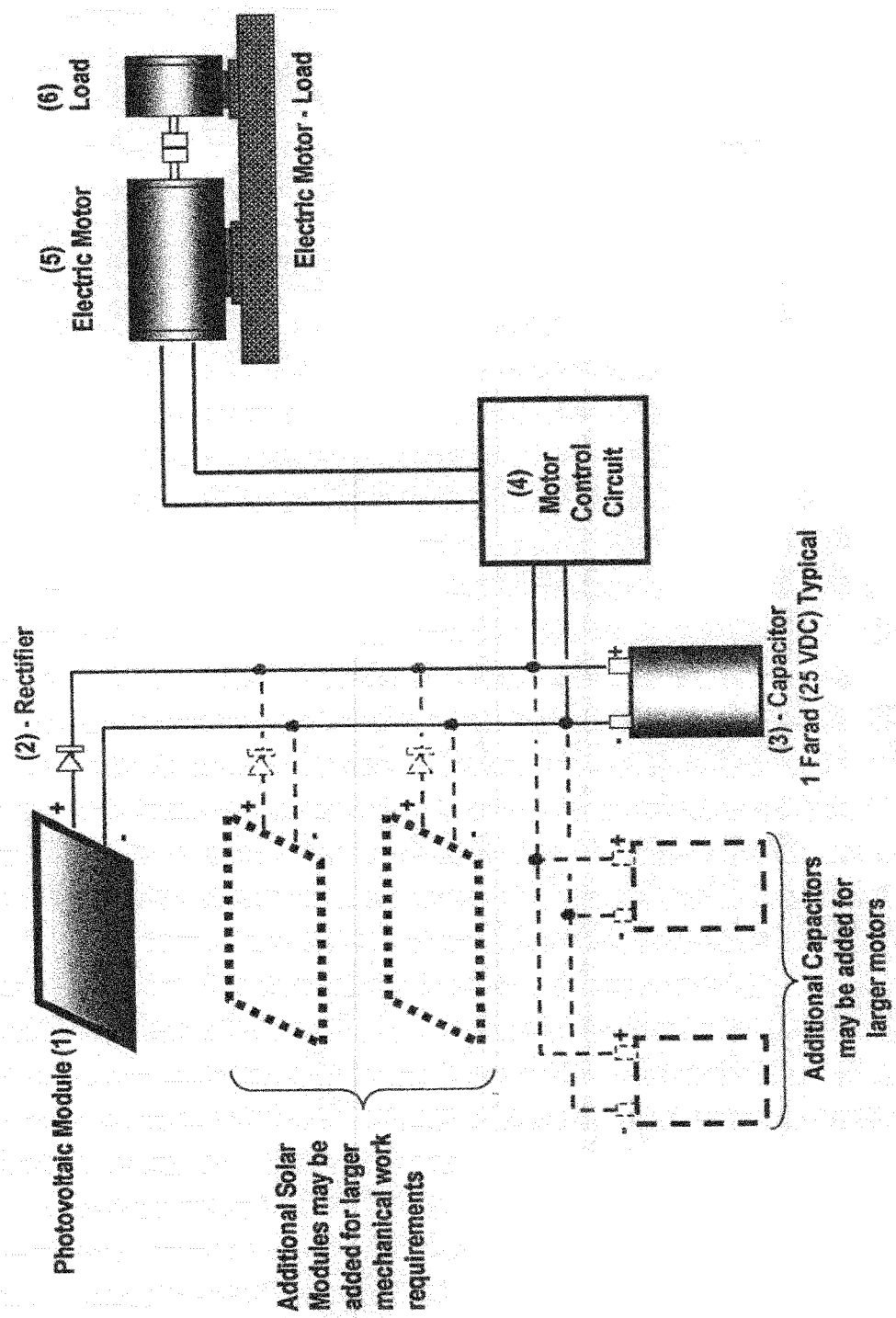

What is claimed is:

1. A battery-less solar power system that drives an electric motor with the energy generated by a photovoltaic source that provides insufficient power to sustain the continuous operation of the said motor, comprising:

a photovoltaic source that because of size or low light influx generates electric power at a level below the minimal necessary to start or sustain the continuous operation of the electric motor being driven;

a capacitor electrically coupled to the photovoltaic source, sized to store sufficient energy to start and sustain the operation of the said electric motor for a period of time, long enough to drive a power device, wherein the calculations for the charging and discharging of said capacitor are based on the following equation:

$$C=(I*t)/V$$

where,
C=Capacitance in Farads
I=Electric Current of the system in Amps
t=Time in Seconds
V=Voltage of the capacitor in Volts; and a start-stop motor control circuit electrically coupled between the capacitor and the driven electric motor that energizes the motor once the capacitor has stored sufficient energy to sustain it running for a period of time long enough for the motor to drive a power device and de-energizes it once the voltage in the capacitor decreases to a point where the efficient operation of the driven motor is no longer considered practical.

2. The solar power system of claim 1 further including a rectifier electrically coupled between the photovoltaic source and the capacitor.

3. The solar power system of claim 1 wherein said power device mechanically driven by said motor is an air compressor.

4. The solar power system of claim 1 wherein said power device mechanically driven by said motor is a water pump.

5. The solar power system of claim 1 wherein said power device mechanically driven by said motor is a hydraulic pump.

6. The solar power system of claim 2 wherein said power device mechanically driven by said motor is an air compressor.

7. The solar power system of claim 2 wherein said power device mechanically driven by said motor is a water pump.

8. The solar power system of claim 2 wherein said power device mechanically driven by said motor is a hydraulic pump.

* * * * *

UNITED STATES PATENT AND TRADEMARK OFFICE
CERTIFICATE OF CORRECTION

PATENT NO.    : 6,367,259 B1
DATED         : April 9, 2002
INVENTOR(S)   : Miguel A. Timm It is certified that error appears in the above-identified patent and that said Letters Patent is hereby corrected as shown below:

Title page,
Delete the title page and substitute the attached title page.

Drawings,
Delete drawing sheets 1, 3-5 and substitute therefore attached drawing sheets 1, 3-5.

Column 3,
Line 41, "1=Electric Current in Amps" should read -- I =Electric Current in Amps --.

Signed and Sealed this

First Day of October, 2002

Attest:

JAMES E. ROGAN
Attesting Officer        Director of the United States Patent and Trademark Office

(12) United States Patent
Timm

(10) Patent No.: US 6,367,259 B1
(45) Date of Patent: Apr. 9, 2002

(54) BATTERY-LESS SOLAR POWER SYSTEM

(76) Inventor: Miguel A. Timm, 17319 Cypress Spring Dr., Spring, TX (US) 77388-5721

(*) Notice: Subject to any disclaimer, the term of this patent is extended or adjusted under 35 U.S.C. 154(b) by 0 days.

(21) Appl. No.: 09/504,504

(22) Filed: Feb. 15, 2000

(51) Int. Cl.$^7$ ............................................. B60K 16/00
(52) U.S. Cl. ................................. 60/641.8; 60/641.15
(58) Field of Search ........................... 60/641.1, 641.8, 60/641.15

(56) References Cited

U.S. PATENT DOCUMENTS

| | | | |
|---|---|---|---|
| 4,626,983 A | * 12/1986 | Harada et al. | 363/132 |
| 5,005,360 A | 4/1991 | McMurtry | |
| 5,576,533 A | * 11/1996 | Tantraporn | 250/214 R |
| 5,621,248 A | * 4/1997 | De Villiers | 290/30 R |
| 5,775,107 A | 7/1998 | Sparkman | |
| 5,809,784 A | 9/1998 | Kreuter | |
| 5,884,481 A | 3/1999 | Johansson et al. | |
| 5,898,585 A | * 4/1999 | Sirichote et al. | 363/132 |

* cited by examiner

*Primary Examiner*—Hoang Nguyen

(57) ABSTRACT

A photovoltaic energy system that accumulates mechanical energy, i.e., pneumatic or hydraulic pressure, or performs mechanical work, i.e., pumping water, without using electrochemical batteries. The system includes one or more photovoltaic panels, one or more high capacitance electrical capacitors, an electrical motor and an electric/electronic control circuit. In essence, the system takes the energy produced by the photovoltaic modules and accumulates it in the capacitors. Once enough energy is accumulated to run the motor, the controller circuit activates the motor. As the motor consumption is larger than the power produced by the photovoltaic module, it takes current from the charged capacitors and the voltage in the capacitors quickly decreases. Once the voltage reaches a minimum where the operation of the motor is no longer practical, the control circuit stops the motor to let the photovoltaic modules recharge the capacitors and the cycle is then repeated. What the above arrangement does is to take the small amount of power generated by a photovoltaic modules and concentrate it in an electrical capacitor. The accumulated energy is then used to produce a burst of power to run an electrical motor which in turn performs the desired mechanical work such as compressing air, pumping hydraulic pressure or pumping water.

8 Claims, 5 Drawing Sheets

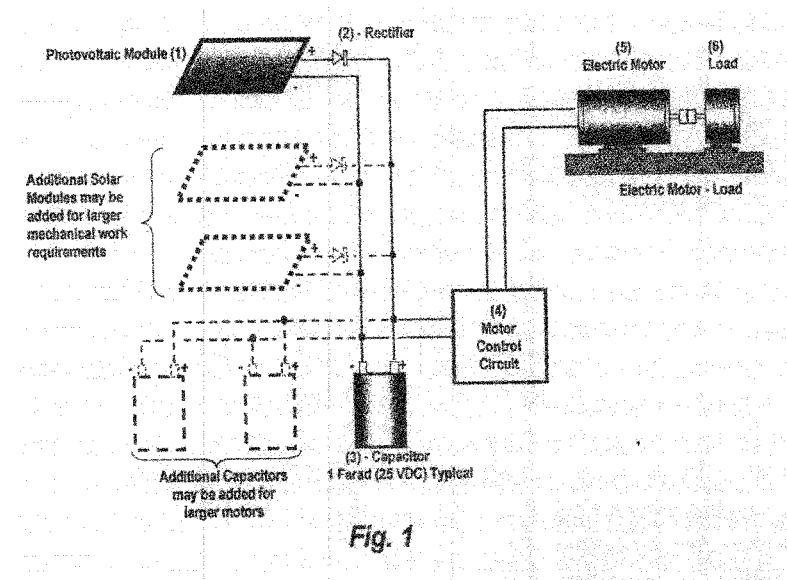

Fig. 1